UNITED STATES PATENT OFFICE.

THOMAS C. BURGIS, OF NEW YORK, N. Y., ASSIGNOR OF NINE-SIXTEENTHS TO JOHN E. JAMES, OF BROOKLYN, AND EDWARD V. VAN DUZER, OF TOMPKINSVILLE, NEW YORK.

PROCESS OF MAKING DETERGENT COMPOUNDS.

SPECIFICATION forming part of Letters Patent No. 573,438, dated December 22, 1896.

Application filed May 3, 1895. Serial No. 548,030. (No specimens.)

*To all whom it may concern:*

Be it known that I, THOMAS C. BURGIS, of the city and county of New York, in the State of New York, have invented a new and useful Improvement in the Method of Making Renovating Compounds, of which the following is a specification.

My invention relates to an improvement in the method of making renovating compounds, with the object in view of providing a compound which will effectually remove dirt and soiled spots from carpets and other fabrics without in any manner destroying their color or fiber.

For making a quantity of thirty gallons of the compound I take seven and one-half pounds of soap, slice it into thin wafer-like chips, and to this I add three pounds of lump borax, three ounces of glycerin, three-quarters of an ounce of cedar-oil, and nine gallons of soft water. The mixture so made is then heated to a degree somewhat less than boiling, about 200° Fahrenheit being preferred, great care being taken that it does not boil until the several ingredients are dissolved, and then, while the solution is hot and after the ingredients have become dissolved, I force into the solution twenty-one gallons of soft cold water and permit the mass to stand for several hours until it becomes a jelly.

The cold water referred to as being forced into the mass is preferably applied by discharging it from the nozzle of a hose under considerable head, so as to cause a thorough mixing of the cold water throughout the mass, and if the power of the stream is not sufficient to effect such a thorough mixing it would be advisable to agitate the mass while the cold water is being introduced.

What I claim is—

The process of forming a renovating compound, consisting in forming a mixture of soap, borax, glycerin, cedar-oil and soft water, raising the mixture to a degree of temperature near but not quite to the boiling-point and maintaining it at that temperature until the several ingredients are completely dissolved and then while the solution is still hot introducing cold water into the mass and agitating the mass and finally allowing the solution to congeal, substantially as set forth.

THOMAS C. BURGIS.

Witnesses:
FREDK. HAYNES,
GEORGE BARRY.